2 Sheets—Sheet 2.
T. SANDS.
Ice-Cream Freezer.
No. 219,878. Patented Sept. 23, 1879.
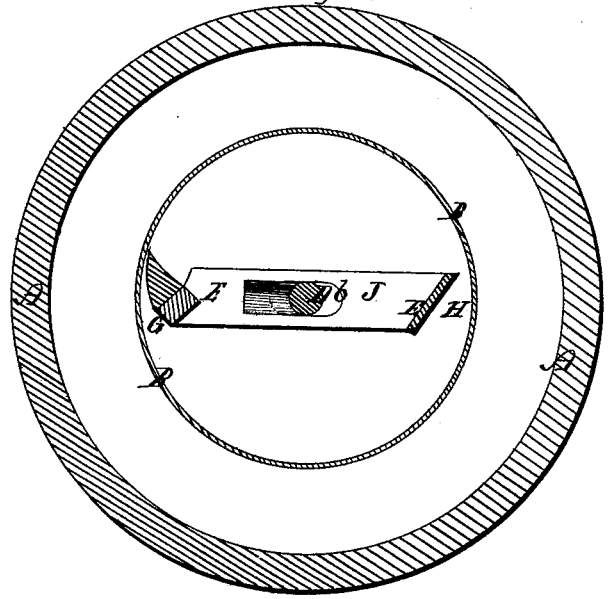
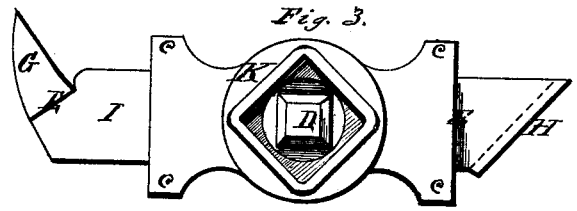
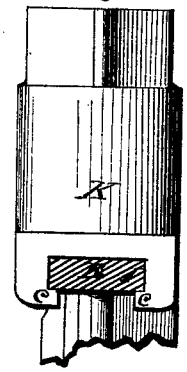
WITNESSES
E. M. Gallaher.
John. L. Coudron
INVENTOR,
Thomas Sands,
By J. S. Brown,
his ATTORNEY.
N. PETERS, PHOTO-LITHOGRAPHER, WASHINGTON, D. C.

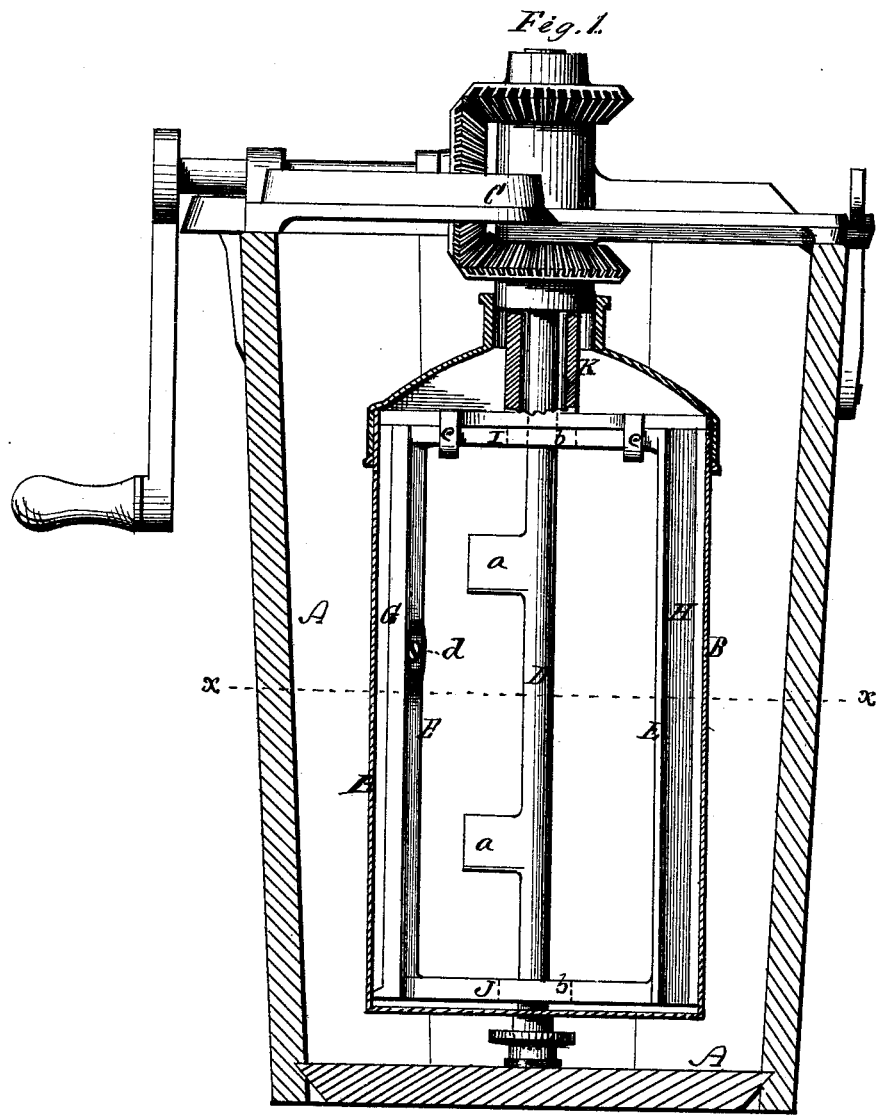

UNITED STATES PATENT OFFICE.

THOMAS SANDS, OF LACONIA, NEW HAMPSHIRE.

IMPROVEMENT IN ICE-CREAM FREEZERS.

Specification forming part of Letters Patent No. 219,878, dated September 23, 1879; application filed April 29, 1879.

*To all whom it may concern:*

Be it known that I, THOMAS SANDS, of Laconia, in the county of Belknap and State of New Hampshire, have invented an Improved Ice-Cream Freezer; and I do hereby declare that the following is a full and exact description thereof, reference being had to the accompanying drawings, making part of this specification.

The nature of my invention consists in the construction of the revolving beater with a scraping-blade on one side, acting to draw itself toward the inner surface of the cream-can and to force the cream therefrom, and a counter inclined blade on the other side, acting to assist the movement of the scraping-blade and to force the cream toward the inner surface of the can, the said beater also being arranged to have a free lateral movement within proper limits irrespective of its axis of revolution, all substantially as and for the purpose herein specified.

Figure 1 is a central vertical section of the principal parts of my improved ice-cream freezer, showing some of the parts in elevation; Fig. 2, a horizontal section thereof in a plane indicated by the line $x$ $x$, Fig. 1; Figs. 3 and 4, views of parts detached.

Like letters designate corresponding parts in all of the figures.

I have represented my present improvements as applied to the triple-motion ice-cream freezer heretofore patented by me; but the improvements may be applied to ice-cream freezers of other constructions.

In the drawings, A represents the tub or holder which contains the freezing-mixture, and in which the other parts are mounted; B, the cream-can; C, the gear-frame; D, the driving-shaft, and E the beater. In this triple motion freezer the can B is coupled at the bottom to the shaft D, driven by one of the gear-wheels, there being oblique beater-blades $a$ $a$ on the shaft to lighten up the cream. The main beater E revolves around the shaft D, driven in the opposite direction by another of the gear-wheels.

The principal feature of my invention consists in mounting the beater E, so that the entire beater has a lateral self-adjusting sliding movement in such a way as to allow one scraper or blade, G, thereon to move in contact with the inner surface of the cream-can B, the said scraper having an oblique position, as shown in Figs. 2 and 3, whereby in passing through the cream the resistance of the same tends to press the scraper against the surface of the can, while a blade, H, at the opposite side of the beater is inclined in the other direction in relation to the motion of the beater, as shown in the same figures, so that its surface also acts upon the cream to help force the scraper against the side of the can. The two inclined surfaces thus arranged also act, one to drive the cream toward the surface of the can, and the other to force it from the said surface. Thus a constant interchange and motion of all parts of the cream is effected.

The blade H does not reach to the surface of the can when the scraper G is in contact with it; but there is a space between sufficient to freely allow all the lateral movement of the beater required for the purpose of this invention.

As a very simple and efficient means of mounting the beater to have the above-specified movement, I form in the two cross pieces or heads I J, which compose the bearings of the beater, slots or oblong holes $b$ $b$, in which the shaft D turns, so that it can automatically have the desired lateral movement; and, further, to form the proper driving connection between this beater and the driving-gear, I make a separate coupling-socket, K, which has clips $c$ $c$ at the bottom to embrace the upper beater-head, I, so that it will be coupled thereto, and yet allow the beater-head to slide in the clips for adjusting the beater laterally. The center shaft, D, which extends through a vertical hole in the coupling-socket, serves to keep the said socket centered in position.

By this construction of the coupling-socket, and mode of attaching it to the beater also, I am enabled to remove and replace the socket if it wears out or becomes injured, since on removing the scraper G the socket can be slipped from the beater-head I at that side of the beater, and another slipped on in the same way.

The scraper, which is best made of wood, is made removable, being attached to the beater-side generally by a single screw, *d*, as represented in Fig. 1 of the drawings.

The advantages of the above-described construction and arrangement of the beater are sufficiently apparent, since, besides the obvious improvement by way of simplicity and cheapness of construction, dispensing with springs, and ease of cleaning the beater, the operation of the scraper is quite perfect.

What I claim as my invention, and desire to secure by Letters Patent, is—

1. In an ice-cream freezer, a revolving beater, E, having a free self-adjusting lateral movement on its shaft, substantially in the manner and for the purpose herein specified.

2. In an ice-cream freezer having a self-adjusting revolving beater, E, on its shaft, the combination of an inclined scraping-blade, G, on one side of the beater, and an oppositely-inclined blade, H, on the other side of the said beater, substantially as and for the purpose herein specified.

3. The combination of the beater-heads I J, having slots or elongated bearings, with the central driving-shaft, D, substantially as and for the purpose herein specified.

4. The combination of the coupling-socket K, provided with clips *c c*, and the beater-head I, sliding in the said clips, substantially as and for the purpose herein specified.

THOMAS SANDS.

Witnesses:
  J. S. BROWN,
  HENRY W. WATSON.